United States Patent [19]

Fujii

[11] 4,242,399
[45] Dec. 30, 1980

[54] CORRUGATED PAPERBOARD FOR TRIM BOARD AND METHOD OF PRODUCING THE SAME

[75] Inventor: Toshihiko Fujii, Atsugi, Japan

[73] Assignee: Nissan Motor Company, Limited, Yokohama, Japan

[21] Appl. No.: 912,964

[22] Filed: Jun. 6, 1978

[30] Foreign Application Priority Data

Jun. 9, 1977 [JP] Japan .................................. 52-68587

[51] Int. Cl.² .......................... B32B 3/28; B32B 3/00
[52] U.S. Cl. .................................. 428/186; 156/210; 156/228; 428/174; 428/194; 428/195; 428/212

[58] Field of Search ............... 428/186, 182, 174, 184, 428/212, 194, 195, 214; 156/210, 310, 228

[56] References Cited

U.S. PATENT DOCUMENTS

4,093,482  6/1978  Ogata et al. .......................... 428/186

*Primary Examiner*—Paul J. Thibodeau

[57] ABSTRACT

One of two liners between which a corrugated medium is disposed is temporarily or expediently fixed to the medium. Upon press-forming, slippage of the temporarily fixed liner relative to the medium occurs, so that no wrinkles are produced in the liner.

11 Claims, 18 Drawing Figures

ELONGATION

CORRUGATED PAPERBOARD FOR TRIM BOARD AND METHOD OF PRODUCING THE SAME

FIELD OF THE INVENTION

The present invention relates in general to flat (press-formable) and shaped (press-formed) corrugated paperboards and methods of producing the same, the shaped corrugated paperboard serving as the substrate of a wall covering material for the interior of cars, ships and/or buildings. This invention is particularly concerned with the prevention of wrinkling in curved section of the shaped or press-formed board. In the specification, the terms "flat corrugated paperboard" and "shaped corrugated paperboard" are to be understood as referring to "corrugated paperboard prior to press-forming", and "corrugated paperboard which has been press-formed", respectively.

BACKGROUND OF THE INVENTION

In the field of wall covering board materials, to afford comforts and/or decorative effects to the interior of cars, ships or buildings, a corrugated paperboard has recently attracted increasing attention as a basic material because of its light weight, low cost, good heat and sound insulating ability and fairly good adaptability to various mechanical processing. In automobiles, for example, trim boards such as roof trim boards of corrugated paperboard base have already been in practical use on an industrial scale.

The trim boards of this type usually consist of a substrate of shaped corrugated paperboard and a skin or facing layer which is laid on one side of the substrate for producing protective, decorative and/or cushioning effects. In most cases, the shaped corrugated paperboard takes the form of a double-faced board given by bonding liners to both sides of a corrugated medium using a thermoplastic resin as the adhesive. A variety of sheet materials are usable as the facing layer. The useful materials may roughly be classified into woven or non-woven cloths, soft plastics sheets, artificial leathers and laminated materials given by any of these sheet materials with a cushioning layer such as a urethane foam layer. Since walls (including ceiling) to be covered with these trim boards usually have curved surfaces, the trim boards are produced as at least partly curved boards in conformance with the curved wall surfaces. Press-forming with application of heat is usually used for producing curved trim boards of corrugated paperboard. In most cases, a flat or press-formable corrugated paperboard) alone is formed into a desired shape by means of a hot-press, followed by the application of the facing layer onto the shaped corrugated paperboard with the interposal of a hot-melt type adhesive layer and followed by the application of another hot-press to accomplish the bonding between the shaped paperboard and the facing layer.

However, the above-mentioned method has encountered the following problem at the time of press-forming of the corrugated paperboard substrate, originating from the tight bonding between each side of the corrugated medium and the bonding liner. When the press-formable substrate is press-formed into a partly or entirely curved board, wrinkles tend to appear in curved areas of the liner on a smaller radius side which undergoes a remarkable contraction to give shrinkages. This will be well understood from FIGS. 1A and 1B.

Usually, the afore-mentioned wrinkles are covered by the facing layer. However, the presence of wrinkles in the shaped paperboard frequently results in that the outer surface of the facing layer shows visible traces of the wrinkles since the facing layer is quite thin. The presence of such traces of course impairs the decorative effect and hence the commercial value of the trim board.

OBJECTS OF THE INVENTION

It is thus an object of the present invention to solve the above-described problem of the occurrence of wrinkles at press-forming of corrugated paperboard to produce a shaped substrate for a trim board.

It is another object of the present invention to provide an improved method of producing a flat press-formable board made of corrugated paperboard which is to be press-formed by means of a hot-press into at least partly curved and shaped board which serves as the substrate of a trim board for application to the interior of cars, ships and/or buildings, which method has the advantages in that no wrinkling or shrinkage occurs in the curved area of the corrugated paperboard under the press forming.

It is still another object of the present invention to provide an improved press-formable corrugated paperboard which can be press-formed without producing wrinkles or shrinkage in the curved area of the same.

It is still another object of the present invention to provide an improved press-formed corrugated paperboard which has no wrinkle or shrinkage even in the curved area thereof.

SUMMARY OF THE DRAWINGS

Other objects and advantages of the present invention will become apparent from the following description when taken in conjunction with the accompanying drawings, in which.

DESCRIPTION OF THE PREFERRED EMBODIMENTS

Prior to describing the method of producing the flat corrugated paperboard according to the invention, explanation of the conventional method for producing a corrugated paperboard used as the substrate of a wall covering material will be made, with the aid of FIGS. 1A to 4, in order to clarify the inventive step of the invention.

Figure 1A:
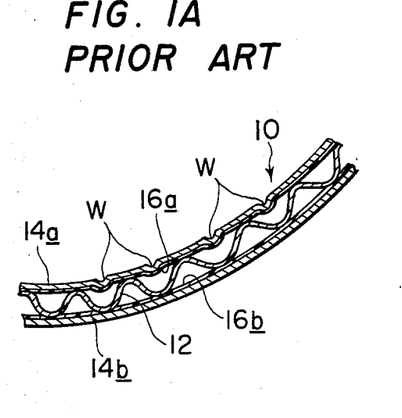
FIG. 1A is a sectional view of shaped corrugated paperboard produced by press-forming a conventional flat corrugated paperboard, showing wrinkles or shrinkages W on one of the liners of the shaped corrugated paperboard.
Figure 1B:
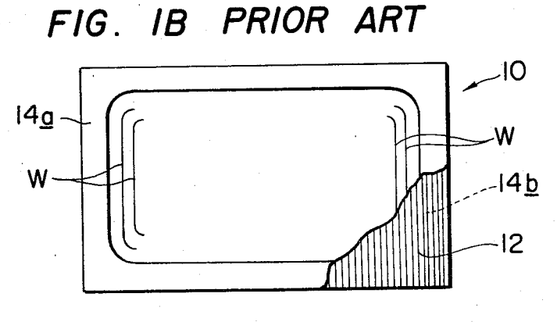
FIG. 1B is a partially cut-away plan view of the shaped corrugated paperboard of FIG. 1A.
Figure 2:
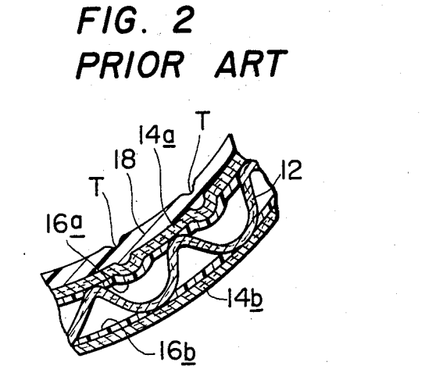
FIG. 2 is an enlarged sectional view of a trim board which is given by applying a facing layer or sheet material on the liner of the shaped corrugated paperboard of FIG. 1A, the facing layer showing visible traces T of the wrinkles.
Figure 3:
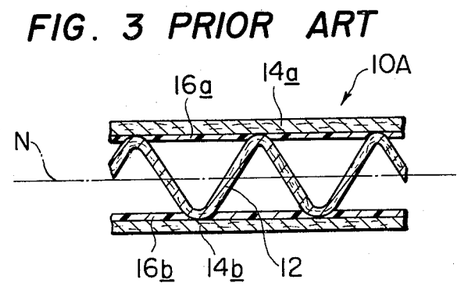
FIG. 3 is a sectional view of a conventional flat corrugated paperboard which is the intermediate of the shaped paperboard of FIG. 1A.

FIGS. 1A and 1B show a shaped and partly curved corrugated paperboard 10 which is made by a conventional flat corrugated paperboard 10A by press-forming the same. As is best seen in FIG. 3, the flat corrugated paperboard 10 is a double-faced board given by covering both sides of a corrugated medium 12 of paper with paper liners 14a and 14b. The tight bonding of the liners 14a and 14b to the corrugated medium 12 is achieved by adhesive layers 16a and 16b which are initially coated on the inner surfaces of the respective liners 14a and 14b. Alternatively both sides of the corrugated medium 12 may initially be coated with adhesive material. The material of the adhesive layers 16a and 16b is thermoplastic resins such as polyethylene. The crests of the corrugated medium 12 are deeply embedded in the corresponding adhesive layers 16a and 16b for strong bonding therebetween. As shown in FIG. 2, a facing layer or sheet material 18 is laid on the liner 14a with interposal of an adhesive layer (omitted from the illustration) of a hot-melt type for production of a trim board.

Figure 4:
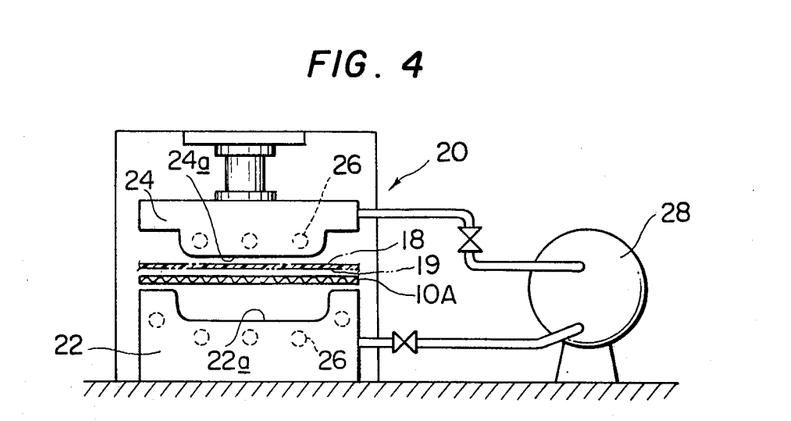
FIG. 4 is a schematic elevation of a hot-press machine for shaping flat corrugated paperboard.

FIG. 4 shows a hot-press machine 20 for use in the production of shaped corrugated paperboard trim boards of the type as shown in FIG. 2. As is usual, the hot-press machine 20 has stationary or female die 22 and a movable or male die 24. Heating pipes 26 are embedded in both the stationary and movable dies 22 and 24, so that the dies 22 and 24 can be heated to desired temperatures by passing an appropriately heated fluid therethrough from an external heat source 28.

In the case of shaping corrugated paperboard in advance of the application of the facing layer 18 thereto, a flat board 10A of corrugated paperboard is placed on a die face 22a of the heated stationary die 22 and then the heated movable die 24 (which has a projected face 24a) is lowered to press the board 10A against the die face 22a. Since heat is applied to the board 10A in this state, the thermoplastic resin layer 16a and 16b becomes soften or fluidify. Accordingly, the corrugated medium 12 and the liners 14a and 14b can be laterally displaced to a certain extent via slippage and are allowed to individually and differently be stretched or shrunk during the press-forming. Owing to this phenomenon, the flat corrugated paperboard 10A can be shaped into the partly curved or desired curved board 10. The thermoplastic resin layers 16a and 16b again solidify upon temperature reduction after the press-forming, so that the shaped board 10 retains its curved shape. Then the facing layer 18 is bonded onto the recessed side or the liner 14a of the shaped board 10 by means of a separate hot-press process.

In the separate hot-press process, the facing layer 18, which is preliminarily laid with a hot-melt sheet 19 such as polyethylene film, is placed over the shaped corrugated paperboard 10 which is still on the stationary die 22. Then, the heated movable die 24 is lowered to press the facing layer 18 against the shaped corrugated paperboard 10. As a result, the facing layer 18 is bonded to the corrugated paperboard 10 by the function of the fluidified hot-melt 19 as an adhesive to form a trim board.

In practice, however, the following problem has been encountered at the time of press-forming of the flat corrugated paperboard 10A. When the flat board 10A is press-formed into the partly curved board 10 in a manner as has been mentioned above, many wrinkles as indicated by "W" in FIGS. 1A and 1B tend to appear in curved areas of the liner 14a which undergoes a remarkable contraction to give shrinkages. As has been mentioned, the presence of such wrinkles W results in that the outer surface of the facing layer 18 shows visible traces T of the wrinkles W since the facing layer 18 is relatively thin, as will be understood from FIG. 2.

For clarification of the inventive step of the invention, explanation of the mechanism of generation of the wrinkles "W" will be made with reference to FIGS. 3 and 4.

It is considered that the conventional flat corrugated paperboard 10A has a so-called truss construction which is substantially defined by the corrugated medium 12 and the two liners 14a and 14b strongly bonded to both sides of the medium 12. Thus, a neutral plane N of the flat trussed paperboard 10A longitudinally passes through the substrate 10 at substantially equal distances from the liners 14a and 14b so long as significant rigidity is present therein even when pressed by the hot-press machine 20. Thus, the liners 14a and 14b undergo to generate compressive stress and elongative or stretching stress respectively, the absolute magnitudes of which are substantially equal. However, with increase of the downward movement of the movable die 24, the board 10A enters a state wherein the rigidity of the board 10A is substantially lost upon the adhesive layer 16a being supplied with significant heat from the movable die 24 to soften or fluidify. However the adhesive layer 16b does not simultaneously soften or fludify significantly because of lack of sufficient heat applied thereto from the stationary die 22 due to the presence of the clearance formed between the liner 14b and the die face 22a of the stationary die 22. Under these conditions, the neutral plane N is shifted toward the liner 14b, resulting in that the compression stress generated in the liner 14a is considerably increased in comparison with the stretching or elongative stress in the liner 14b, which causes appearance of the wrinkles W in the liner 14a.

Upon analysis of the above described wrinkle causing mechanism, a corrugated paperboard and a method of constructing the same have been conceived whereby wrinkle formation can be totally eliminated.

Figure 5:
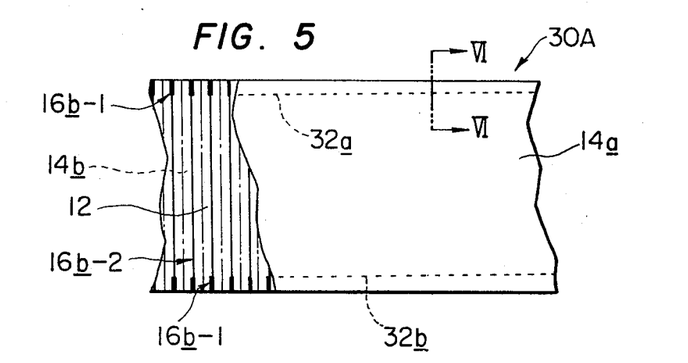
FIG. 5 is a partially cut-away plan view of a flat corrugated paperboard which is produced by the method of the invention.
Figure 6:
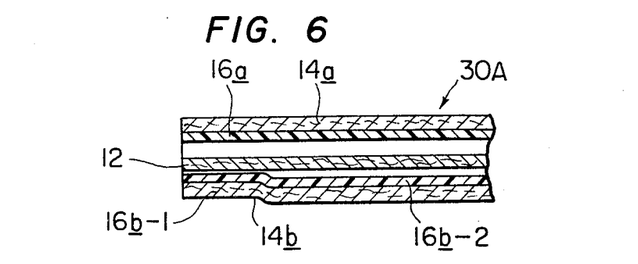
FIG. 6 is an enlarged sectional view taken along the line VI—VI of FIG. 5.

Referring to FIGS. 5 and 6, there is illustrated a flat corrugated paperboard 30A which is produced by a method according to the present invention. The flat or non-shaped substrate 30A shown has generally the same construction as the before-mentioned flat corrugated paperboard 10A. Thus, for simplification of description and drawings, a detailed explanation of the substantially the same parts will be omitted and the same numerals will be used for indicating the same parts as in the case of the conventional one.

In the flat corrugated paperboard 30A, the bonding of the liners 14a and 14b to the corrugated medium 12 is such made that a normal or tight bonding is given between the liner 14a and the upper side of the corrugated medium 12, while an expedient or temporarily bonding is given between the liner 14b and the lower side of the medium 12. In other words, a weak bond is positively or intentionally made between the liner 14b and the medium 12. As will be understood from FIGS. 5 and 6, the tight bonding between the liner 14a and the medium 12 is achieved by allowing the crests defined on the upper side of the medium 12 to be deeply and entirely embedded in the adhesive layer 16a which is initially coated on the inner surface of the liner 14a. While, the expedient bonding between the liner 14b and the corrugated medium 12 is given by allowing only lateral edge portions, indicated by numerals 32a and 32b in FIG. 5, of crests defined on the lower side of the medium 12 to be embedded in the adhesive layer 16b. Thus, portions other than the edge portions are separated or disengaged from the adhesive layer 16b, as will be understood from FIG. 8A.

Figure 13:
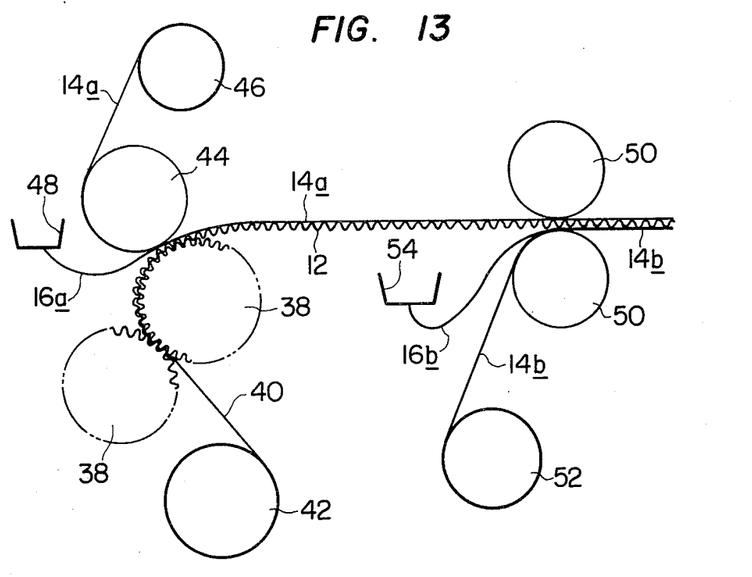
FIG. 13 is a sketch showing a process of producing a flat corrugated paperboard of the invention.
Figure 14A:
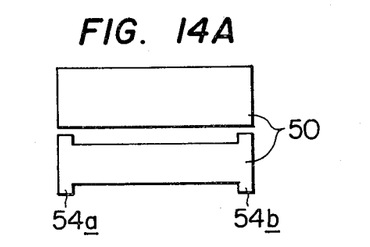
FIGS. 14A, 14B and 14C are views of press rollers used in the process of FIG. 13 for producing the respective flat corrugated paperboards of FIGS. 5, 9 and 10.

For production of this flat corrugated paperboard 30A, an improved corrugated paperboard production machine is used. In FIG. 13, the machine is schematically illustrated. The machine comprises a pair of corrugating rollers 38 by which a paper 40 from a supplier 42 is corrugated to form the corrugated medium 12. A press roller 44 is arranged to press the liner 14a from a liner supplier 46 against one of the corrugating rollers 38 with the interposal of the fluidified adhesive layer 16a supplied from an adhesive supplier 48 so that the liner 14a is normally or tightly bonded to the upper side of the corrugated medium 12. After this process, the semiassembled medium (14a and 12) is passed through a clearance defined by a pair of press rollers 50 the construction of which is well shown in FIG. 14A. The insertion of the semiassemblied medium (14a and 12) into the clearance is made with the liner 14b from a liner supplier 52 with the interposal of the fluidified adhesive layer 16b from an adhesive supplier 54 in a manner to achieve the expedient or temporarily bond between the liner 14b and the lower side of the corrugated medium 12. As is seen in FIG. 14A, one of the press rollers 50 is formed with two spaced cylindrical land portions 54a and 54b. The land portions, in operation, press the lateral edge portions of the assembled members 14a, 12 and 14b against the other roller. With this, the flat corrugated paperboard 30A is prepared.

Indicated by numerals 16b-1 in FIGS. 5 and 6 are sections where the bond is made by the land portions 54a and 54b, while indicated by numerals 16b-2 are sections where bonding is not made.

Figure 7:
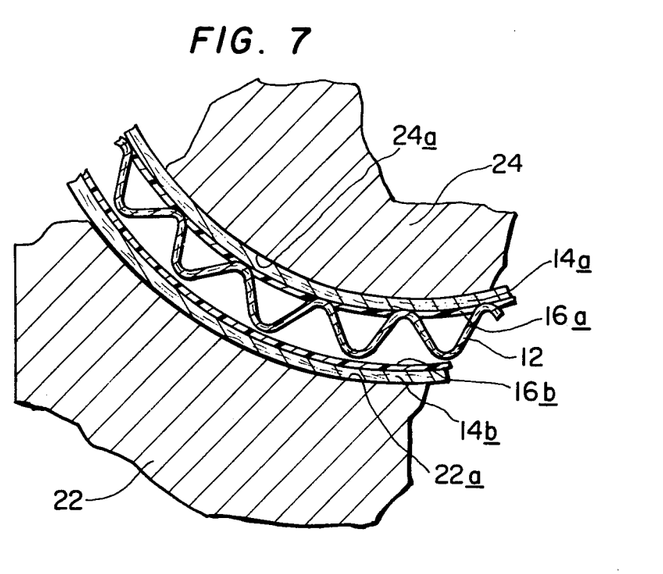
FIG. 7 is a view showing the press-forming of the flat corrugated paperboard to shape the same.

FIG. 7 is a schematical view showing the hot-press step used for shaping the flat corrugated paperboard 30A into the desired shape. In shaping the flat corrugated paperboard 30A, the paperboard 30A is placed on the heated stationary or female die 22 in a manner that the liner 14b faces toward this female die 22. Then the heated movable die 24 is lowered to press the board 30A against the die face 22a.

With this, it has been observed that the flat corrugated paperboard 30A can be shaped into the partly curved board 30 without producing the undesirable wrinkles. In fact, no wrinkle or shrinkage appears in the curved areas of the liner 16a of the shaped paperboard 30.

Figure 8A:
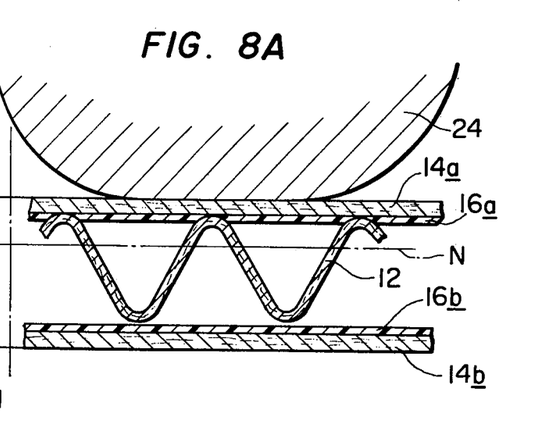
FIGS. 8A and 8B are views depicting the magnitude of internal stress generated in the flat corrugated paperboard of FIG. 5 at the time when it is subjected to press-forming.
Figure 8B:
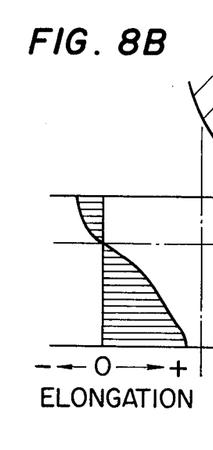

The reason for the absence of the wrinkles in the shaped corrugated paperboard 30 will be explained with the aid of FIGS. 8A and 8B.

In the flat corrugated paperboard 30A, the bonding of the liner 14b to the corrugated medium 12 is substantially zero at laterally middle portion thereof so that strong truss construction is not formed. Thus, the neutral plan N moves to be laid or placed adjacent the liner 14a. This means that under the press-forming process, only a very small contraction action is produced in the liner 14a, as will be understood from FIG. 8B. Furthermore, when the heated movable die 24 is lowered to contact the liner 14a, the adhesive layer 16a soften by heat given by the die 24 thereby permitting relative displacement between the liner 14a and the corrugated medium 12. This minimizes the contraction action mentioned above. During the press forming procedure, relative displacement between the liner 14b and the corrugated medium 12 is freely made due to the disengagement therebetween. This induces that no wrinkles or shrinkage appears in the curved area of the liner 14a.

Figure 9:
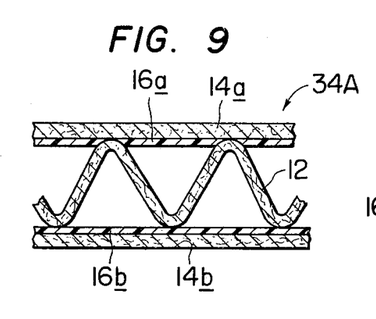
FIGS. 9 and 10 are views of other flat corrugated paperboards which are also produced by the method of the present invention.
Figure 10:
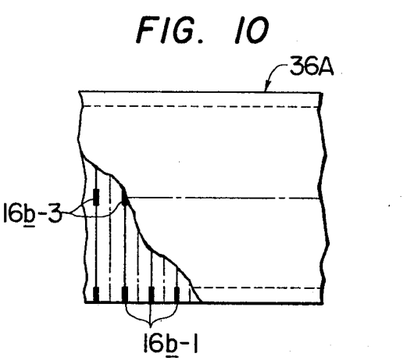

FIGS. 9 and 10 show other flat corrugated paperboards 34a and 36A, each being an intermediate of the shaped corrugated paperboard 30.

Figure 14B:
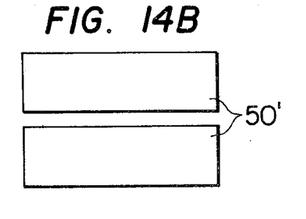

For production of the flat board 34A of FIG. 9, a pair of press rollers 50' of a type as shown in FIG. 14B are used instead of the rollers 50 of FIG. 14A. The press rollers 50' are such arranged that the clearance defined by them is slightly larger than conventional value so that the crests defined on the lower side of the corrugated medium 12 are shallowly embedded in the layer 16b as shown in FIG. 9.

Figure 14C:
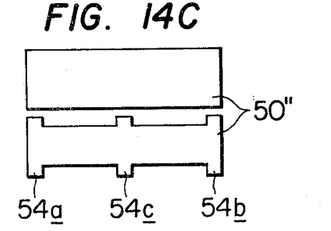

For production of the flat board 36A of FIG. 10, press rollers 50" of a type as shown in FIG. 14C are used. The rollers 50" are substantially the same as the above mentioned rollers 50 with an exception that an additional land 54c is mounted on the generally middle portion of the roller. The additional land 54c, in operation, presses the middle portion of the assembled members 36A, indicated by numerals 16b-3, for bonding in the middle portion.

Figure 11:
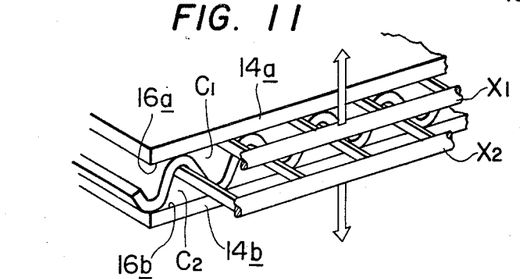
FIG. 11 is a sketch for explaining a test method of measuring the bonding force given between a temporarily or expediently bonded liner and the corrugated medium of the flat corrugated paperboard of FIG. 9.

Experiment has revealed that in case of the flat corrugated paperboard 34A of FIG. 9, the force of the expedient bonding between the liner 14b and the corrugated medium 12 should not exceed approximately 15 kg according to the JIS Z0402 (Japanese Industrial Standard). This test method generally comprises, as will be understood from FIG. 11, inserting a pair of prong members $X_1$ and $X_2$ into cells $C_1$ and $C_2$ respectively defined between the liner 14a and the corrugated medium 12 and between the liner 14b and the medium 12; pulling the prong members $X_1$ and $X_2$ away from each other in the direction of the illustrated arrows; and reading the tension load applied to the prong members just as the liner 14b is torn away from the corrugated medium 12. The test piece according to this test should have a size of $2'' \times 2''$, and a corrugation numbers of $36 \pm 3$ per linear 30 cm.

Figure 12:
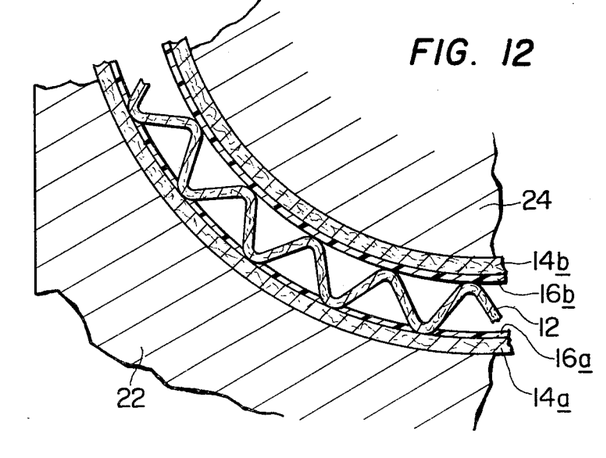
FIG. 12 is a view showing an alternative press-forming method also applicable to form the shaped corrugated paperboard according to the present invention.

FIG. 12 is a view showing an alternative hot-press step for producing the shaped paperboard 30 from the flat corrugated paperboard. In this case, the paperboard (30A, 34A or 36A) is placed on the stationary die 22 in a manner that the liner 14a (not the liner 14b) faces toward the die 22. This is contrary to the step mentioned in the section of FIG. 7. Under press-forming by this alternative step, relative displacement between the liner 14b and the corrugated medium 12 is freely made also due to the disengagement therebetween. Experiment has revealed that this alternative step is quite usable for forming a shaped corrugated paperboard which is slightly curved.

It should be noted that the foregoing description shows only few embodiments. Various modifications will be apparent to those skilled in the art without departing from the scope of the present invention which is only limited by the appended claims.

What is claimed is:

1. A press-formable corrugated paperboard substrate which is to be press-formed to form a shaped board substrate of a trim board, comprising:
   a corrugated medium of paper having first and second groups of crests, said first group of crests being defined on one face of said medium and said second group of crests being defined on the other face of said medium;
   a first liner of paper placed on said first group of crests;
   a first layer of thermoplastic resin disposed between said first liner and said first group of crests to achieve tight bonding therebetween;
   a second liner of paper placed on said second group of crests; and
   a second layer of thermoplastic resin disposed between said second liner and said second group of crests to achieve bonding therebetween, the total bonding force provided between said second liner and said second group of crests being less than that between said first liner and said first group of crests, resulting in that upon being subjected to press-forming under heating, relative displacement between said second liner and each of said second group of crests occurs while that between said first liner and each of said first group of crest portions is prevented.

2. A press-formable corrugated paperboard substrate as claimed in claim 1, in which each of said second group of crests is partially bonded to said second liner.

3. A press-formable corrugated paperboard substrate as claimed in claim 1, in which only a portion of said second group of crests is bonded to said second liner so that another portion thereof is separated from said second liner.

4. A press-formable corrugated paperboard substrate as claimed in claim 1, in which each of said second group of crests is bonded only at the longitudinal both ends thereof to said second liner.

5. A press-formable corrugated paperboad substrate as claimed in claim 1, in which each of said first group of crests is more deeply embedded in said first thermoplastic resin layer than each of said second group of crests is in said second layer of thermoplastic resin layer.

6. A method of producing a press-formable corrugated paperboard substrate which is to be press-formed to form a shaped board substrate of a trim board, comprising the steps of:

(a) placing a first liner of paper on one face of a corrugated medium of paper;
(b) bonding said first liner entirely and fixedly to first crests defined on the one face by positioning therebetween a first layer of thermoplastic resin which bonds said first crests and said first liner;
(c) placing a second liner of paper on the other face of said corrugated medium; and
(d) affixing said second liner to second crests defined on the other face of said corrugated medium by positioning therebetween a second layer of thermoplastic resin which bonds said second liner and said second crests in such a manner that a total bonding force provided between said second liner and said second crest portions is less than that between said first liner and said first crest portions, thereby resulting in that upon being subjected to press-forming under heating, relative displacement between said second liner and each of said second crests occurs while that between said first liner and each of said first crests is prevented.

7. A method as claimed in claim 6, in which each of said second crests is partially bonded to said second liner.

8. A method as claimed in claim 6, in which only a portion of second crests is bonded to said second liner so that another portion thereof is separated from said second liner.

9. A method as claimed in claim 6, in which each second crest is bonded only at the longitudinal both ends thereof to said second liner.

10. A method as claimed in claim 6, in which each of said first crests is more deeply embedded in said first layer of thermoplastic resin than each of said second set of crests is in said second layer of thermoplastic resin.

11. A method of producing a shaped corrugated paperboard substrate for a trim board, comprising the steps of:

(a) preparing a press-formable corrugated paperboard substrate comprising a corrugated medium of paper having first and second groups of crests, said first group of crests being defined on one face of said medium and said second group of crests being defined on the other face of said medium; a first liner of paper placed on said first group of crests; a first layer of thermoplastic resin disposed between said first liner and said first group of crests to achieve tight bonding therebetween; a second liner of paper placed on said second group of crests; and a second layer of thermoplastic resin disposed between said second liner and said second group of crests to achieve bonding therebetween, the total bonding force provided between said second liner and said second group of crests being less than that between said first liner and said first group of crests, resulting in that upon being subjected to press-forming under heating, relative displacement between said second liner and each of said second group of crests occurs while that between said first liner and each of said first group of crests is prevented;
(b) placing said press-formable corrugated substrate on a heated female die in a manner that an outside face of said second liner faces toward the die face of said female die; and
(c) pressing said press-formable corrugated substrate against said female die by using a heated male die.

* * * * *

UNITED STATES PATENT AND TRADEMARK OFFICE
CERTIFICATE OF CORRECTION

PATENT NO. : 4,242,399
DATED : December 30, 1980
INVENTOR(S) : TOSHIHIKO FUJII

It is certified that error appears in the above-identified patent and that said Letters Patent are hereby corrected as shown below:

On The Title Page,

Change the Foreign Application Priority Data from "June 9, 1977(JP) Japan -- 52-68587" to ----June 9, 1977(JP) Japan -- 52/68587 and April 27, 1978(JP) Japan -- 53/50426 ----

Signed and Sealed this

Thirty-first Day of August 1982

[SEAL]

Attest:

Attesting Officer

GERALD J. MOSSINGHOFF
*Commissioner of Patents and Trademarks*